(12) United States Patent
Griniasty

(10) Patent No.: US 8,175,135 B1
(45) Date of Patent: May 8, 2012

(54) EQUALIZER WITH ADAPTIVE NOISE LOADING

(75) Inventor: Meir Griniasty, Kfar Saba (IL)

(73) Assignee: Marvell International Ltd., Hamilton (BM)

( * ) Notice: Subject to any disclaimer, the term of this patent is extended or adjusted under 35 U.S.C. 154(b) by 280 days.

(21) Appl. No.: 12/612,695

(22) Filed: Nov. 5, 2009

Related U.S. Application Data

(60) Provisional application No. 61/117,639, filed on Nov. 25, 2008, provisional application No. 61/117,644, filed on Nov. 25, 2008.

(51) Int. Cl.
*H04B 1/00* (2006.01)

(52) U.S. Cl. ........ 375/147; 375/229; 375/230; 375/343; 375/346; 375/350

(58) Field of Classification Search ................ 375/136, 375/142, 147, 150, 229–236, 343, 346–350
See application file for complete search history.

(56) References Cited

U.S. PATENT DOCUMENTS

| | | | |
|---|---|---|---|
| 5,572,552 A | 11/1996 | Dent et al. | |
| 5,687,162 A * | 11/1997 | Yoshida et al. | 370/203 |
| 6,034,986 A | 3/2000 | Yellin et al. | |
| 6,151,358 A * | 11/2000 | Lee et al. | 375/232 |
| 6,879,623 B2 | 4/2005 | Agami et al. | |
| 7,042,926 B2 | 5/2006 | Yellin et al. | |
| 7,058,116 B2 | 6/2006 | Moshavi et al. | |
| 2002/0136158 A1 | 9/2002 | Frank | |
| 2003/0022636 A1 | 1/2003 | Ylitalo et al. | |
| 2003/0081701 A1 | 5/2003 | Pick et al. | |
| 2003/0095588 A1 | 5/2003 | Yellin et al. | |
| 2003/0142732 A1 | 7/2003 | Moshavi et al. | |
| 2004/0136444 A1 | 7/2004 | Massicotte et al. | |
| 2004/0141548 A1 | 7/2004 | Shattil | |
| 2004/0174939 A1 | 9/2004 | Wang | |
| 2005/0094713 A1 | 5/2005 | Yellin | |
| 2007/0117527 A1 | 5/2007 | Xu et al. | |

FOREIGN PATENT DOCUMENTS

| | | |
|---|---|---|
| EP | 0 721 264 A | 7/1996 |
| WO | WO 98 18210 A | 4/1998 |
| WO | WO 01 22609 A1 | 3/2001 |
| WO | WO 2005046075 A1 | 5/2005 |

OTHER PUBLICATIONS

"3rd Generation Partnership Project; Technical Specification Group Radio Access Network; Physical layer aspects of UTRA High Speed Downlink Packet Access (Release 4)," 3GPP TR 25.848 V4.0.0 Technical Report, 3GPP, Valbonne France, pp. 1-89 (2001).

"Revised HSDPA UE Performance Requirements," TSG-RAN-Working Group 4(Radio), Meeting #20, East Brunswick, NJ, USA, 3GPP TS 25.101 V3.7.0. pp. 1-4 (Nov. 12-16, 2001).

"Comments on the CPICH Interference Cancellation Scheme," TSG-RAN-Working Group 4(Radio), Meeting #21, Sophia Antipolis, France (Jan. 28-Feb. 1, 2002).

(Continued)

*Primary Examiner* — Curtis Odom

(57) ABSTRACT

A method for communication includes receiving signals at a receiver from one or more sources, including a target signal transmitted by a given transmitter. A channel response is estimated from the given transmitter to the receiver, and a filter response is computed by taking a sum of an autocorrelation of the received signals with an adaptive noise factor, and applying the sum to the estimated channel response. The filter response is applied to the received signals in order to recover the target signal.

16 Claims, 2 Drawing Sheets

OTHER PUBLICATIONS

Verdu, Multiuser Detection, Cambridge University Press, Table of Contents and pp. 154-213, 234-272,288-329,344-387 (1998).

"3rd Generation Partnership Project; Technical Specification Group Radio Access Network; User Equipment (UE) radio transmission and reception (FDD) (Release 8)," 3GPP TR 25.101 V8.0.0 Technical Report, 3GPP, Valbonne France, pp. 1-78 (2007).

M. Nillson; Written Opinion of the International Searching Authority; Patent Cooperation Treaty; Nov. 30, 2000; International application No. PCT/US 00/22504.

G. Bottomley, T. Ottosson, Y. Wang, "A Generalized RAKE Receiver for Interference Suppression", IEEE Journal on Selected Areas in Communications, vol. 18, No. 8, IEEE (2000).

M. Lenardi, A Medles & D. Slock, "SINR maximizing equalizer receiver for DS-CDMA," Proc. EUSIPCO, France (2000).

M. Lenardi & D. Slock, "A Rake receiver with intracell interference cancellation for a DS-CDMA synchronous downlink with orthogonal codes," Proc. IEEE VTC Conf. Tokyo, Japan (2000).

K. Hooli, M. Juntti, & M. Latva-Aho, "Inter-path Interference Suppression in WCDMA Systems with Low Spreading Factors", IEEE VTC Conf Proceedings (1999).

K. Hooli, M. Juntti, & M. Latva-Aho, "Performance Evaluation of Adaptive Chip-Level Channel Equalizers in WCDMA Downlink", IEEE Conf. Proceedings (2001).

Change request on "Specification of enhanced performance requirements type 3i for HSDPA based on two-branch equaliser with interference cancellation," TSG-RAN-Working Group 4(Radio), Meeting #45, Jeju, Korea (Nov. 5-9, 2007).

"3rd Generation Partnership Project; Technical Specification Group Radio Access Network; User Equipment (UE) radio transmission and reception (FDD) (Release 8)," 3GPP TR 25.101 V8.6.0 Technical Report, 3GPP, Valbonne France, pp. 1-78 (2009).

Lohan et al., "Highly Efficient Techniques for Mitigating the Effects of Multipath Propagation in DS-CDMA Delay Estimation", IEEE Transactions on Wireless Communications, vol. 4, No. 1, pp. 149-162, Jan. 2005.

Griniasty, M., U.S. Appl. No. 12/612,694 "Hybrid Equalizer" filed Nov. 5, 2009.

* cited by examiner

EQUALIZER WITH ADAPTIVE NOISE LOADING

CROSS-REFERENCE TO RELATED APPLICATION

This application claims the benefit of U.S. Provisional Patent Applications 61/117,639 and 61/117,644, both filed Nov. 25, 2008, which are incorporated herein by reference.

FIELD OF THE DISCLOSURE

The present disclosure relates generally to communication systems, and specifically to filtering of signals in a communication receiver.

BACKGROUND OF THE DISCLOSURE

Code division multiple access (CDMA) modulation is commonly used in cellular telephone networks and other wireless communication systems. For example, CDMA is used in the Wideband CDMA air interface developed by the 3rd Generation Project Partnership (3GPP), as well as other emerging communication standards; and the term "CDMA," as used in the context of the present patent application, is intended to encompass all communication schemes that use this type of modulation. CDMA transmitters modulate data streams that are to be transmitted over the air using pseudo-random bit sequences, which are known as spreading codes. Each bit in the spreading code is commonly referred to as a "chip," and the bit rate of the spreading code (which is typically much larger than the symbol rate of the transmitted data) is known as the chip rate.

Each user has a unique spreading code. Thus, multiple CDMA signals, using different spreading codes, can be transmitted simultaneously in the same spectral band. The receiver demodulates the received data signal by correlating the signal with the same spreading code that was used in transmission, in an operation that is known as despreading. Under ideal transmission conditions, the despreading operation will perfectly separate the desired data stream from all of the other CDMA signals in the spectral band. In practice, however, multi-path transmission channels and noise lead to loss of orthogonality between the signals (meaning that different CDMA signals may interfere with one another), which may, if uncorrected, result in errors in decoding the received data.

The description above is presented as a general overview of related art in this field and should not be construed as an admission that any of the information it contains constitutes prior art against the present patent application.

SUMMARY OF THE DISCLOSURE

Embodiments that are described hereinbelow provide methods and devices for filtering received signals.

There is therefore provided, in accordance with an embodiment, a method for communication, including receiving signals at a receiver from one or more sources, including a target signal transmitted by a given transmitter, and estimating a channel response from the given transmitter to the receiver. A filter response is computed by taking a sum of an autocorrelation of the received signals with an adaptive noise factor, and applying the sum to the estimated channel response. The filter response is applied to the received signals in order to recover the target signal.

In some embodiments, computing the filter response includes computing an autocorrelation matrix of the received signals and calculating a scalar value of the noise factor, and summing the autocorrelation matrix with a product of the scalar value multiplied by an identity matrix to give a sum matrix for use in computing the filter. Typically, computing the filter response includes inverting the sum matrix, and multiplying the inverted sum matrix by a channel matrix representing the estimated channel response.

Additionally or alternatively, computing the filter response includes finding the adaptive noise factor by multiplying a reference value of the autocorrelation by a variable noise fraction, which is determined by a signal/noise ratio (SNR) of the target signal. In a disclosed embodiment, applying the filter response includes extracting symbols from the target signal, and computing the filter response includes estimating the SNR based on the extracted symbols, making a comparison between the SNR and a previous SNR value, and adjusting the variable noise fraction responsively to the comparison.

In some embodiments, the signals include code division multiple access (CDMA) signals, and applying the filter response includes applying an equalization filter in order to orthogonalize the received signals.

There is also provided, in accordance with an embodiment of the present invention, a method for communication, including receiving signals at a receiver from one or more sources, including a target signal transmitted by a given transmitter, and estimating a channel response from the given transmitter to the receiver. A filter response is applied to the received signals in order to extract symbols from the target signal. A signal/noise ratio (SNR) of the target signal is estimated based on the extracted symbols, and a variable noise fraction is adjusted by comparing the estimated SNR to a previous value of the SNR. The filter response is computed by taking a sum of an autocorrelation associated with the signals with a product of the variable noise fraction multiplied by a reference value of the autocorrelation, and applying the sum to the estimated channel response.

In a disclosed embodiment, the autocorrelation is taken over the received signals. Additionally or alternatively, the autocorrelation is taken over the estimated channel response.

There is additionally provided, in accordance with an embodiment of the present invention, a receiver, including a front end, which is configured to receive and digitize signals from one or more sources, including a target signal transmitted by a given transmitter. A filter, which has a filter response, is configured to filter the received signals in order to recover the target signal. A controller is configured to estimate a channel response from the given transmitter to the receiver and to compute the filter response by taking a sum of an autocorrelation of the received signals with an adaptive noise factor, and applying the sum to the estimated channel response.

There is further provided, in accordance with an embodiment of the present invention, a receiver, including a front end, which is configured to receive and digitize signals from multiple sources, including a target signal transmitted by a given transmitter. A filter, which has a filter response, is configured to filter the received signals in order to recover the target signal. A controller is configured to estimate a channel response from the given transmitter to the receiver, to estimate a signal/noise ratio (SNR) of the target signal based on the extracted symbols, to adjust a variable noise fraction by comparing the estimated SNR to a previous value of the SNR, and to compute the filter response by taking a sum of an autocorrelation associated with the signals with a product of the variable noise fraction multiplied by a reference value of the autocorrelation, and applying the sum to the estimated channel response.

The present disclosure will be more fully understood from the following detailed description of the embodiments thereof, taken together with the drawings, in which:

DETAILED DESCRIPTION OF EMBODIMENTS

Figure 1:
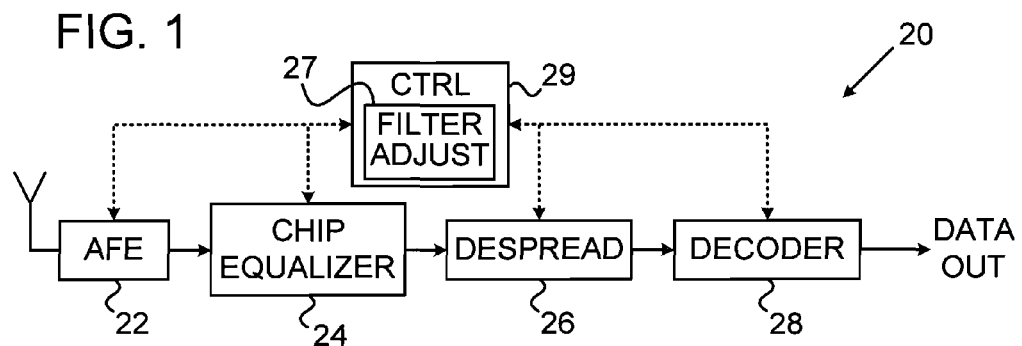
FIG. 1 is a block diagram that schematically illustrates a CDMA receiver, in accordance with a disclosed embodiment.

FIG. 1 is a block diagram that schematically illustrates a CDMA receiver 20, in accordance with a disclosed embodiment. In this simplified illustration, only those elements of the receiver that are necessary for an understanding of the present disclosure are shown in the figure, in abstract, block-level form. The complete design of the receiver will be apparent to those skilled in the art upon reading the description that follows. This sort of receiver is suitable for use, for example, as part of a mobile communication device, such as a cellular telephone, but the principles of its operation may similarly be applied in other sorts of communication devices and systems, including both mobile and stationary systems, operating in accordance with any applicable CDMA-based communication standard.

An analog front end (AFE) 22 amplifies, down-converts and digitizes incoming radio signals to generate a stream of digital samples of the incoming radio signals. The samples, taken at the chip rate, are referred to as "chips," and the sequence of the samples may be represented as a chip vector:

$$Y = \Sigma_b H_b X_b + \eta \quad (1)$$

wherein the sum is taken over all transmitting base stations b. $H_b$ is the channel matrix (i.e., the channel response in matrix form) from base station b to the receiver, $X_b$ is the transmitted vector of chips from base station b, and $\eta$ is additive noise.

A chip equalizer 24 filters the sample sequence in order to recover the target signal that was transmitted from the base station of interest, b=0, in the form of a chip vector $X_0$. The output of the chip equalizer is a restored chip vector:

$$\hat{X}_0 = W^+ Y \quad (2)$$

wherein W is the filter response matrix of the equalizer, and the "+" superscript indicates the Hermitian transpose. Equalizer 24 typically comprises a multi-tap time-domain digital filter, although the equalization function may alternatively be performed in the frequency domain.

The optimal filter for equalizer 24 (in terms of minimizing the mean squared error in the restored chips) is given by:

$$W = (\Sigma_b P_b H_b H_b^+ + \sigma^2)^{-1} H_0 \quad (3)$$

wherein $\sigma^2$ is the noise power, $P_b$ is the power of base station b (relative to the power of its pilot signal), and the superscript "−1" represents matrix inversion. The term $H_b H_b^+$ represents the autocorrelation of the channel response for base station b. In common types of CDMA systems, such as WCDMA, the receiver measures the channel response by monitoring a pilot signal that the base station transmits, and comparing the received pilot signal to the known characteristics of the transmitted signal.

Construction of a filter W in accordance with the formula (3) requires that the receiver track the signals from all base stations in order to estimate their channel responses, and also estimate the power of each base station and the noise power. This approach is not practical in many cases. The embodiments described hereinbelow provide alternative methods for computing equalization filters that achieve good performance at lower computational cost.

Returning now to FIG. 1, the equalized chip sequence of equation (2) is correlated with the appropriate spreading code by a despreader 26 (also referred to as a "dispreader"), which outputs a demodulated sequence of symbols. A decoder 28 processes the symbols to recover the actual data that was transmitted by the base station.

A controller 29 receives and processes data generated by the elements of the receiver in order to compute and update processing parameters, and outputs the updated parameters to the appropriate elements. Specifically, the controller comprises a filter adjustment module 27, which computes the filter response to be applied by equalizer 24, using methods that are described hereinbelow. For this purpose, the controller in some embodiments comprises a microprocessor, which is programmed in software to carry out these functions. Alternatively or additionally, some or all of the functions of controller 29 may be implemented using dedicated hardware circuits and/or other programmable components, such as a digital signal processor or programmable gate array.

Figure 2:
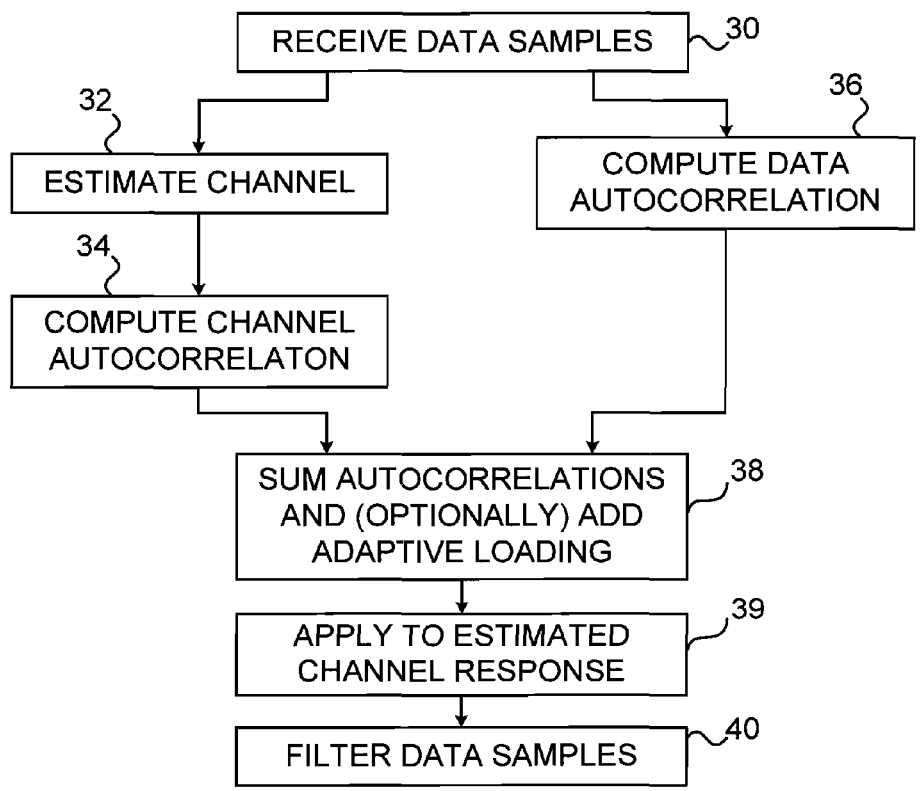
FIG. 2 is a flow chart that schematically illustrates a method for filtering a data signal, in accordance with a disclosed embodiment.

FIG. 2 is a flow chart that schematically illustrates a method for filtering a data signal, in accordance with a disclosed embodiment. The method is described, for convenience and clarity, with reference to receiver 20, as shown in FIG. 1, but it may likewise be implemented in receivers and communication devices of other types. In a receiving operation 30, controller 29 receives data samples based on signals received by AFE 22. The controller uses these samples for two purposes in the context of the present method:

1) The controller estimates the channel response $H_0$ for the base station currently serving the receiver, in a channel estimation operation 32. As noted earlier, the channel response is estimated based on the pilot signals transmitted by the base station. For this purpose, controller 29 may, for example, apply methods described by Lohan et al., in "Highly Efficient Techniques for Mitigating the Effects of Multipath Propagation in DS-CDMA Delay Estimation," *IEEE Transactions on Wireless Communications* 4:1 (2005), which is incorporated herein by reference. The controller then computes the channel autocorrelation, $H_0 H_0^+$, in a channel autocorrelation operation 34. For this purpose, the channel response may be expressed as a Toeplitz matrix, which is formed by concatenating successive rows containing the channel response vector, each row shifted by one time unit relative to the preceding row. The Toeplitz matrix $H_0$ is then multiplied by its Hermitian transpose $H_0^+$. Alternatively, other suitable methods may be used for computing the autocorrelation.

2) The controller computes the data autocorrelation $YY^+$ over the received samples, in a data autocorrelation operation 36. Again, this operation may be performed by arranging vectors of received data samples in a Toeplitz matrix, and then multiplying the Toeplitz matrix by its Hermitian transpose, or using other suitable methods of autocorrelation computation.

Controller 29 computes the channel and data autocorrelation results, and may then combine these results, in a summing operation 38, to give a filter response for application by equalizer 24:

$$W=(YY^+ + \lambda H_0 H_0^+)^{-1} H_0 \quad (4)$$

Here $\lambda$ is a variable weighting factor, which may be set empirically. For example, the weighting factor may be set using the formula $\lambda=YY^+(0)/HH^+(0)$, meaning that the channel and data autocorrelation components receive equal weights. Alternatively, other values for $\lambda$ may also provide suitable results.

For improved performance of the equalizer, however, controller 29 may add an adaptive noise factor in the form of a scalar value C, also referred to as a "noise load," to the diagonal elements of W in operation 38. Computation of this noise factor, which varies adaptively over time in response to changes in the signal/noise ratio (SNR), is described hereinbelow with reference to FIG. 3. The resulting filter response is computed by applying the result of operation 38 to the estimated channel response $H_0$, in an applying operation 39. The filter response is then given by:

$$W=(YY^+ + \lambda H_0 H_0^+ + CI)^{-1} H_0 \quad (5)$$

wherein I is the identity matrix and, again, in accordance with an embodiment of the disclosure, $\lambda$ may be set according to $\lambda=YY^+(0)/HH^+(0)$, as noted above. Equalizer 24 applies this response in filtering the received data samples, as shown above in equation (2), in a filtering operation 40.

Figure 3:
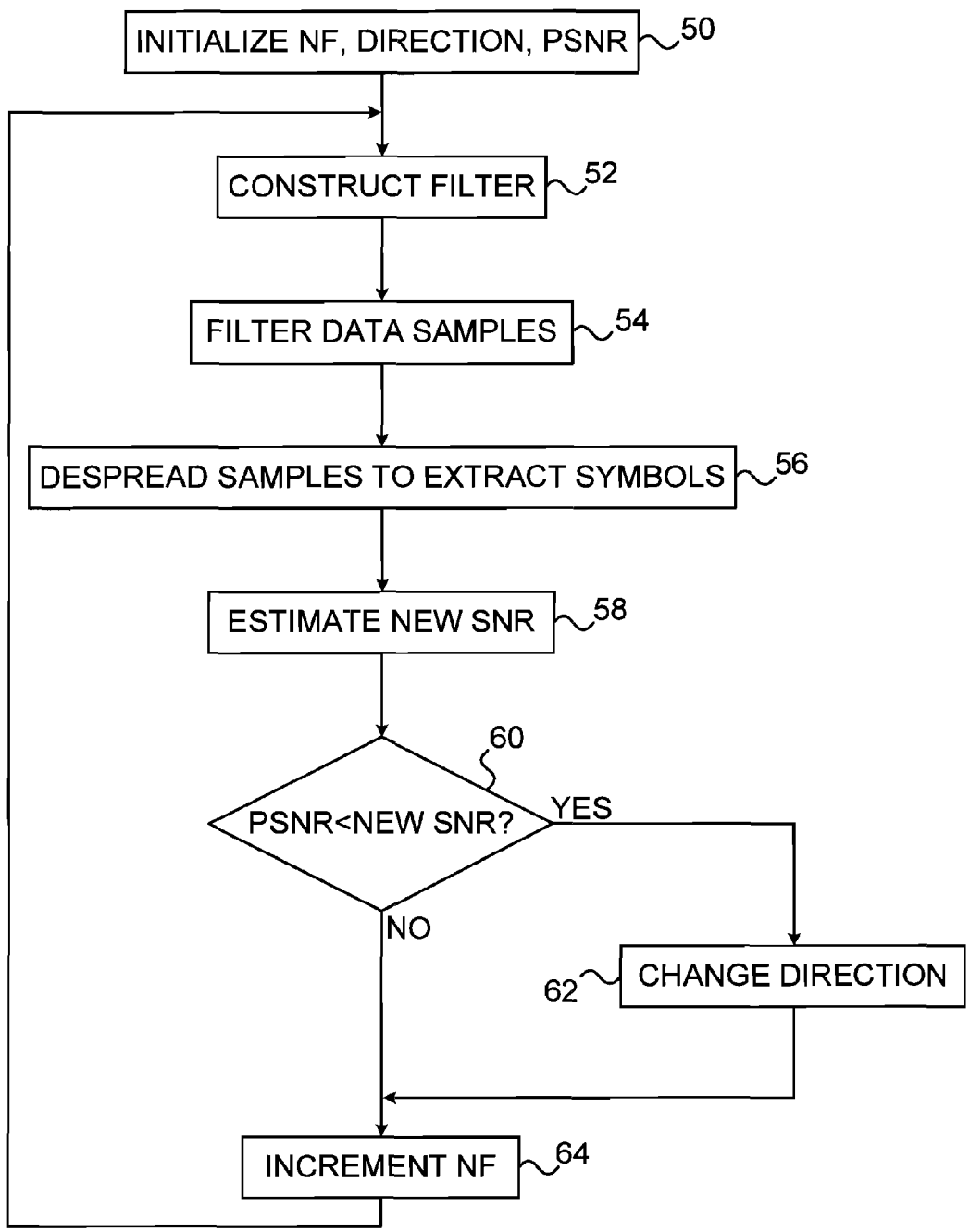
FIG. 3 is a flow chart that schematically illustrates a method for adjusting an adaptive filter, in accordance with a disclosed embodiment.

FIG. 3 is a flow chart that schematically illustrates a method for computing the adaptive noise factor C, in accordance with a disclosed embodiment. This method runs in a continual loop, since the noise power—and therefore the optimal value of C—may vary over time. The method provides a simple but efficient feedback mechanism that may be used by controller 29 in modifying the chip equalizer noise term.

The method of FIG. 3 uses a number of variable parameters, including a noise fraction NF, a DIRECTION (indicating whether to increase or decrease NF in each cycle of the loop), and a previous signal/noise ratio (PSNR). The adaptive noise factor C at any time is given by the product of the current noise fraction NF with the initial magnitude of data autocorrelation:

$$C = NF * YY^+(0) \quad (6)$$

Initially, NF is set to 0.01, DIRECTION is set to +1, and PSNR is set to 1, in an initialization operation 50. Alternatively, other suitable initial values may be used.

Controller 29 computes the filter response of equalizer 24 by inserting the current value of NF into equation (6), and inserting the resulting value of C into equation (5), in a filter construction operation 52. Equalizer 24 applies this filter response to the data samples that it receives from AFE 22, in a filtering operation 54. Despreader 26 then despreads the filtered samples in order to extract the received data symbols, in a despreading operation 56.

Controller 29 measures the deviation of the extracted symbols from their expected values in order to estimate a new SNR value, in a SNR estimation operation 58. The controller may, for example, compute the SNR based on the difference between the extracted symbols from a received pilot signal and the symbols that are known to be transmitted in the pilot signal. Alternatively, the same sort of computation may be applied to signals transmitted over a High-Speed Downlink Packet Access (HSDPA) channel. A method of SNR computation that may be used in operation 58 is described, for example, in U.S. patent application Ser. No. 12/612,692, filed Nov. 5, 2009, entitled "Calculation of Soft Decoding Metrics," whose disclosure is incorporated herein by reference.

The controller compares the new SNR value to the previous SNR value (PSNR), in a comparison operation 60. If PSNR<NSNR, then the direction of change of NF is switched in a redirection operation 62, i.e., DIRECTION=−DIRECTION. The noise fraction is then adjusted, in an incrementation operation 64:

$$NF = NF + K * DIRECTION \quad (7)$$

wherein K is a constant factor, such as 0.02. NF is not allowed, however, to increase above a given upper bound or decrease below a given lower bound. For example, NF may be held between a minimum value of 0.01 and a maximum value of 0.2. Alternatively, other bounding values may be used.

Controller 29 returns to operation 52 to construct a new filter response based on the adjusted NF value, and the method continues thenceforth.

Although equation (5) above illustrates the use of the adaptive noise factor C in a hybrid equalizer configuration, with a filter response based both on channel autocorrelation and data autocorrelation, this same sort of adaptive noise loading may be used in filters of other types. For example, the adaptive noise factor may be used in a data autocorrelation-based equalizer with the following response:

$$W=(YY^+ + CI)^{-1} H_0 \quad (8)$$

Alternatively, the adaptive noise factor may be used in a channel autocorrelation-based equalizer:

$$W=(H_0 H_0^+ + CI)^{-1} H_0 \quad (9)$$

In each case, different values of the parameters and bounds may be used in computing the increment to the noise fraction (NF) in operation 64, but the basic method may remain the same.

Furthermore, although the embodiments above refer specifically to chip equalization, the principles of the methods and devices presented above may likewise be applied in other types of equalization filters.

It will thus be appreciated that the embodiments described above are cited by way of example, and that the present disclosure is not limited to what has been particularly shown and described hereinabove. Rather, the scope of the present disclosure includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
   receiving signals at a receiver from one or more sources, including a target signal transmitted by a given transmitter;
   estimating a channel response from the given transmitter to the receiver;
   computing a filter response by taking a sum of an autocorrelation of the received signals with an adaptive noise factor, and applying the sum to the estimated channel response; and
   applying the filter response to the received signals in order to recover the target signal,
   wherein computing the filter response comprises computing an autocorrelation matrix of the received signals and calculating a scalar value of the noise factor, and summing the autocorrelation matrix with a product of the scalar value multiplied by an identity matrix to give a sum matrix for use in computing the filter.

2. The method according to claim 1, wherein computing the filter response comprises inverting the sum matrix, and multiplying the inverted sum matrix by a channel matrix representing the estimated channel response.

3. The method according to claim 1, wherein the signals comprise code division multiple access (CDMA) signals, and wherein applying the filter response comprises applying an equalization filter in order to orthogonalize the received signals.

4. A method for communication, comprising:
receiving signals at a receiver from one or more sources, including a target signal transmitted by a given transmitter;
estimating a channel response from the given transmitter to the receiver;
computing a filter response by taking a sum of an autocorrelation of the received signals with an adaptive noise factor, and applying the sum to the estimated channel response; and
applying the filter response to the received signals in order to recover the target signal,
wherein computing the filter response comprises finding the adaptive noise factor by multiplying a reference value of the autocorrelation by a variable noise fraction, which is determined by a signal/noise ratio (SNR) of the target signal.

5. The method according to claim 4, wherein applying the filter response comprises extracting symbols from the target signal, and wherein computing the filter response comprises estimating the SNR based on the extracted symbols, making a comparison between the SNR and a previous SNR value, and adjusting the variable noise fraction responsively to the comparison.

6. A method for communication, comprising:
receiving signals at a receiver from one or more sources, including a target signal transmitted by a given transmitter;
estimating a channel response from the given transmitter to the receiver;
applying a filter response to the received signals in order to extract symbols from the target signal;
estimating a signal/noise ratio (SNR) of the target signal based on the extracted symbols;
adjusting a variable noise fraction by comparing the estimated SNR to a previous value of the SNR; and
computing the filter response by taking a sum of an autocorrelation associated with the signals with a product of the variable noise fraction multiplied by a reference value of the autocorrelation, and applying the sum to the estimated channel response.

7. The method according to claim 6, wherein the autocorrelation is taken over the received signals.

8. The method according to claim 6, wherein the autocorrelation is taken over the estimated channel response.

9. A receiver, comprising:
a front end, which is configured to receive and digitize signals from one or more sources, including a target signal transmitted by a given transmitter;
a filter, which has a filter response and is configured to filter the received signals in order to recover the target signal; and
a controller, which is configured to estimate a channel response from the given transmitter to the receiver and to compute the filter response by taking a sum of an autocorrelation of the received signals with an adaptive noise factor, and applying the sum to the estimated channel response,
wherein the controller is configured to compute the filter response by computing an autocorrelation matrix of the received signals and calculating a scalar value of the noise factor, and summing the autocorrelation matrix with a product of the scalar value multiplied by an identity matrix to give a sum matrix for use in computing the filter.

10. The receiver according to claim 9, wherein the controller is configured to invert the sum matrix, and to multiply the inverted sum matrix by a channel matrix representing the estimated channel response.

11. The receiver according to claim 9, wherein the signals comprise code division multiple access (CDMA) signals, and wherein the filter comprises applying an equalization filter for orthogonalizing the received signals.

12. A receiver, comprising:
a front end, which is configured to receive and digitize signals from one or more sources, including a target signal transmitted by a given transmitter;
a filter, which has a filter response and is configured to filter the received signals in order to recover the target signal; and
a controller, which is configured to estimate a channel response from the given transmitter to the receiver and to compute the filter response by taking a sum of an autocorrelation of the received signals with an adaptive noise factor, and applying the sum to the estimated channel response,
wherein the controller is configured to find the adaptive noise factor by multiplying a reference value of the autocorrelation by a variable noise fraction, which is determined by a signal/noise ratio (SNR) of the target signal.

13. The receiver according to claim 12, wherein the receiver is configured to extract symbols from the target signal, and wherein the controller is configured to estimate the SNR based on the extracted symbols, to make a comparison between the SNR and a previous SNR value, and to adjust the variable noise fraction responsively to the comparison.

14. A receiver, comprising:
a front end, which is configured to receive and digitize signals from multiple sources, including a target signal transmitted by a given transmitter;
a filter, which has a filter response and is configured to filter the received signals in order to recover the target signal; and
a controller, which is configured to estimate a channel response from the given transmitter to the receiver, to estimate a signal/noise ratio (SNR) of the target signal based on the extracted symbols, to adjust a variable noise fraction by comparing the estimated SNR to a previous value of the SNR, and to compute the filter response by taking a sum of an autocorrelation associated with the signals with a product of the variable noise fraction multiplied by a reference value of the autocorrelation, and applying the sum to the estimated channel response.

15. The receiver according to claim 14, wherein the autocorrelation is taken over the received signals.

16. The method according to claim 14, wherein the autocorrelation is taken over the estimated channel response.

* * * * *